(12) United States Patent
Lee et al.

(10) Patent No.: US 11,273,689 B2
(45) Date of Patent: Mar. 15, 2022

(54) AIR VENT APPARATUS FOR VEHICLE

(71) Applicants: Hyundai Motor Company, Seoul (KR); Kia Motors Corporation, Seoul (KR); NIFCO KOREA Inc., Chungcheongnam-do (KR); Hyundai Mobis Co., Ltd., Seoul (KR)

(72) Inventors: Yong Woo Lee, Gyeonggi-do (KR); Ran Jeong Park, Gyeonggi-do (KR); Kwan Woo Lee, Gyeonggi-do (KR); Jong Chae Lee, Chungcheongnam-do (KR); Kee Jin Sung, Chungcheongnam-do (KR)

(73) Assignees: Hyundai Motor Company, Seoul (KR); Kia Motors Corporation, Seoul (KR); NIFCO KOREA Inc., Chungcheongnam-do (KR); Hyundai Mobis Co., Ltd., Seoul (KR)

( * ) Notice: Subject to any disclaimer, the term of this patent is extended or adjusted under 35 U.S.C. 154(b) by 252 days.

(21) Appl. No.: 16/559,975

(22) Filed: Sep. 4, 2019

(65) Prior Publication Data
US 2020/0338964 A1    Oct. 29, 2020

(30) Foreign Application Priority Data

Apr. 24, 2019   (KR) ........................ 10-2019-0047878

(51) Int. Cl.
*B60H 1/34*  (2006.01)
*B60H 1/00*  (2006.01)

(52) U.S. Cl.
CPC ....... *B60H 1/3414* (2013.01); *B60H 1/00564* (2013.01); *B60H 1/00671* (2013.01)

(58) Field of Classification Search
CPC . B60H 1/34; B60H 1/3414; B60H 2001/3471
USPC .................................................. 454/152, 154
See application file for complete search history.

(56) References Cited

U.S. PATENT DOCUMENTS

| | | | |
|---|---|---|---|
| 2013/0210333 A1* | 8/2013 | Kober ................. | B60H 1/3442 454/154 |
| 2017/0057328 A1* | 3/2017 | Sano .................... | B60H 1/3442 |
| 2019/0143795 A1* | 5/2019 | Carrera Contreras ....................... | B60H 1/3442 454/154 |

* cited by examiner

*Primary Examiner* — Vivek K Shirsat
*Assistant Examiner* — Ko-Wei Lin
(74) *Attorney, Agent, or Firm* — Mintz Levin Cohn Ferris Glovsky and Popeo, P.C.; Peter F. Corless

(57) ABSTRACT

An air vent apparatus for a vehicle includes a wing cover mounted at an outlet of an air duct to be movable in a front-rear direction by using a pop-up driving device and angularly adjustable by using a ball joint. The apparatus is configured to simultaneously perform a wind direction adjustment and a damper door function, and can pop-up and then angularly rotate the wing cover around the ball joint in a desired direction, thereby adjusting a wind direction of the air discharged to an interior of the vehicle in the desired direction.

15 Claims, 19 Drawing Sheets

AIR VENT APPARATUS FOR VEHICLE

CROSS-REFERENCE TO RELATED APPLICATION

This application claims under 35 U.S.C. § 119(a) the benefit of Korean Patent Application No. 10-2019-0047878 filed on Apr. 24, 2019, the entire contents of which are incorporated herein by reference.

BACKGROUND

(a) Technical Field

The present disclosure relates to an air vent apparatus for a vehicle, more particularly, to a pop-up type air vent apparatus in which a wing cover is mounted at an outlet of an air duct to be movable in a front-rear direction and angularly adjustable so that the wing cover can simultaneously perform wind direction adjustment and a damper door function.

(b) Description of the Related Art

In general, an air vent for a vehicle is a device for discharging air for cooling and heating according to driving of an air conditioner, and includes a center air vent mounted at a center fascia panel between a driver seat and a front passenger seat, a side air vent mounted at a crash pad at front surface sides of the driver seat and the front passenger seat, etc.

A conventional air vent can be a wing type air vent in which a plurality of horizontal wings and vertical wings are combined, a nozzle type air vent having a wing integral nozzle, etc.

The wing type air vent has a disadvantage in that the number of parts is large and the assembly structure is complicated because the plurality of horizontal wings for adjusting a horizontal wind direction and the plurality of vertical wings for adjusting a vertical wind direction are mounted at an outlet of an air duct, a separate damper door for blocking air discharge is mounted to be openable and closable at a predetermined position of a rear side of the air duct, and in addition, a knob for adjusting a wind direction of each wing and opening/closing of the damper door is mounted at one of the horizontal wings.

Particularly, since the wing type air vent requires a large number of wings to be mounted at the outlet of the air duct, it causes a packaging problem with peripheral parts (e.g., a cluster, an Audio, Video, Navigation (AVN), etc.) and a reduction in the degree of design freedom of the peripheral parts as well as largely occupying the installation areas of the center fascia panel and the crash pad.

As the nozzle type air vent adopts a nozzle having an integral structure of the wings for adjusting the wind direction, the number of parts is reduced as compared to the wing type air vent, but likewise, the nozzle type air vent has a disadvantage of a complicated structure because it requires a separate damper door for blocking air discharge to be mounted to be openable and closable at a predetermined position of the rear side of the air duct, and a knob for adjusting the opening and closing of the damper door to be mounted at the nozzle.

The above information disclosed in this Background section is only for enhancement of understanding of the background of the disclosure and therefore it can contain information that does not form the prior art that is already known in this country to a person of ordinary skill in the art.

SUMMARY

The present disclosure provides a pop-up type air vent apparatus for a vehicle, in which a wing cover is mounted at an outlet of an air duct to be movable in a front-rear direction by using a pop-up driving device, and angularly adjustable by using a ball joint so that the wing cover can simultaneously perform wind direction adjustment and a damper door function.

In addition, another object of the present disclosure is to provide an air vent apparatus for a vehicle, which can pop-up and then angularly rotates a wing cover around a ball joint in a desired direction, thereby adjusting a wind direction of the air discharged to an interior in the desired direction.

For achieving the objects, the present disclosure provides an air vent apparatus for a vehicle configured to include an air duct having a ball joint housing formed therein; a ball housing rotatably fastened within the ball joint housing; an air guide mounted between an outer diameter portion of the ball joint housing and an inner diameter portion of the air duct to straightly guide the air discharged to an interior of the vehicle; a wing cover connected with the ball housing and disposed at an outlet of the air duct to be pop-up and angularly adjustable; and a pop-up driving device connected between the ball housing and the wing cover to pop-up and drive the wing cover.

Preferably, a connecting plate is integrally connected between the outer diameter of the ball joint housing and the inner wall of the air duct so that the ball joint housing is disposed at the inner central portion of the air duct.

In addition, a plurality of rotational angle limiting grooves are formed in the ball joint housing, a ball cap is mounted at a rear portion of the ball housing, and an angle limiting pin selectively inserted into one of the rotational angle limiting grooves is formed to be protruded from a rear surface of the ball cap.

Preferably, the angle limiting pin is inserted into and mounted at the rear surface of the ball cap together with a supporting spring so that the angle limiting pin is selectively inserted into one of the plurality of rotational angle limiting grooves by an elastic restoring force of the supporting spring.

In addition, a resistance providing rubber that is in close contact with the rear surface of the ball cap in order to provide the resistance upon rotation of the ball housing is attached to the inner surface of the ball joint housing.

In addition, the air guide is provided as a structure in which a plurality of streamlined vanes forming a whirlwind for straight wind are connected between an inside ring and an outside ring.

Preferably, the wing cover is composed of a wing body having an air guide surface of the diameter that is gradually narrowed toward the inside of the air duct, and an operating plate fastened to the front surface portion of the wing body and exposed toward the vehicle interior.

In addition, a sealing rubber for blocking air leakage upon closing the wing cover is attached to a portion contacting the outlet of the air duct at the rear surface portion of the wing body of the wing cover.

The pop-up driving device according to an embodiment of the present disclosure is composed of a knob mounted at the front surface of the wing cover; a cam housing fastened to the inside of the ball housing; a fixed cam having a plurality of cam slide grooves formed along the circumferential direction thereof, and provided as a hollow structure in which a latching projection is formed at the rear surface portion thereof to be fastened to the inside of the cam housing; a cam cap formed at a front surface portion of the ball cap mounted at the rear portion of the ball housing, as a plate structure in which a plurality of rotational guide saw teeth are formed at regular intervals along the circumferential direction thereof at the front surface portion thereof; a pop-up rod having the front end portion connected to the rear surface of the knob, and having the rear end portion extended to the inside of the fixed cam through the central portion of the wing cover; a rotary cam provided as a structure in which a plurality of slide cams moving along the cam slide groove are formed along the circumferential direction thereof to be rotatably connected to the rear end portion of the pop-up rod; and a main spring compressibly connected between the rotary cam and the cam cap.

In addition, a concave portion is formed at the inner diameter portion of the ball housing, and a convex portion press-fitted into and fastened to the concave portion is formed at the outer diameter portion of the cam housing.

In addition, a knob seating groove having the knob inserted therein is formed at the front surface of the wing cover.

In addition, an auxiliary spring for providing an elastic restoring force after the knob is pressed is connected between the back surface of the knob and the bottom surface of the knob seating groove.

The pop-up driving device according to another embodiment of the present disclosure is composed of a movable cylinder provided as a structure in which a female screw is formed therein to be integrally formed at the rear end portion of the wing cover; and a fixed cylinder integrally formed at the front end portion of the ball housing as a structure in which a male screw screw-fastened to the female screw is formed.

The pop-up driving device according to still another embodiment of the present disclosure is composed of a movable cylinder provided as a structure in which a multi-stage locking groove is formed therein to be integrally formed at the rear end portion of the wing cover; and a fixed cylinder integrally formed at the front end portion of the ball housing as a structure having a locking protrusion fastened to the multi-stage locking groove.

In addition, a ball is formed at the front end portion of the movable cylinder, and a ball joint groove is formed at the rear surface portion of the wing cover.

The present disclosure provides the following effects through the above configuration.

Firstly, it is possible to mount the wing cover at the outlet of the air duct to be movable in the front-rear direction by using the pop-up driving device and mount the wing cover to be angularly adjustable by using the ball joint so that the wing cover can simultaneously perform the wind direction adjustment and the damper door function.

Secondly, unlike the conventional arrangement in which the damper door is separately mounted inside the air duct, it is possible to perform the damper door function for blocking the air discharge when the wing cover is in the closed position, thereby reducing the number of parts and reducing the number of assembling steps.

Thirdly, it is possible to pop-up and then angularly rotate the wing cover around the ball joint in the desired direction, thereby freely adjusting the wind direction of the air discharged to the interior in the desired direction.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein:

FIG. 13A is a cross-sectional perspective diagram illustrating an internal structure of the cam housing, and FIG. 13B is a perspective diagram illustrating only the fixed cam formed inside the cam housing.

Figure 1:
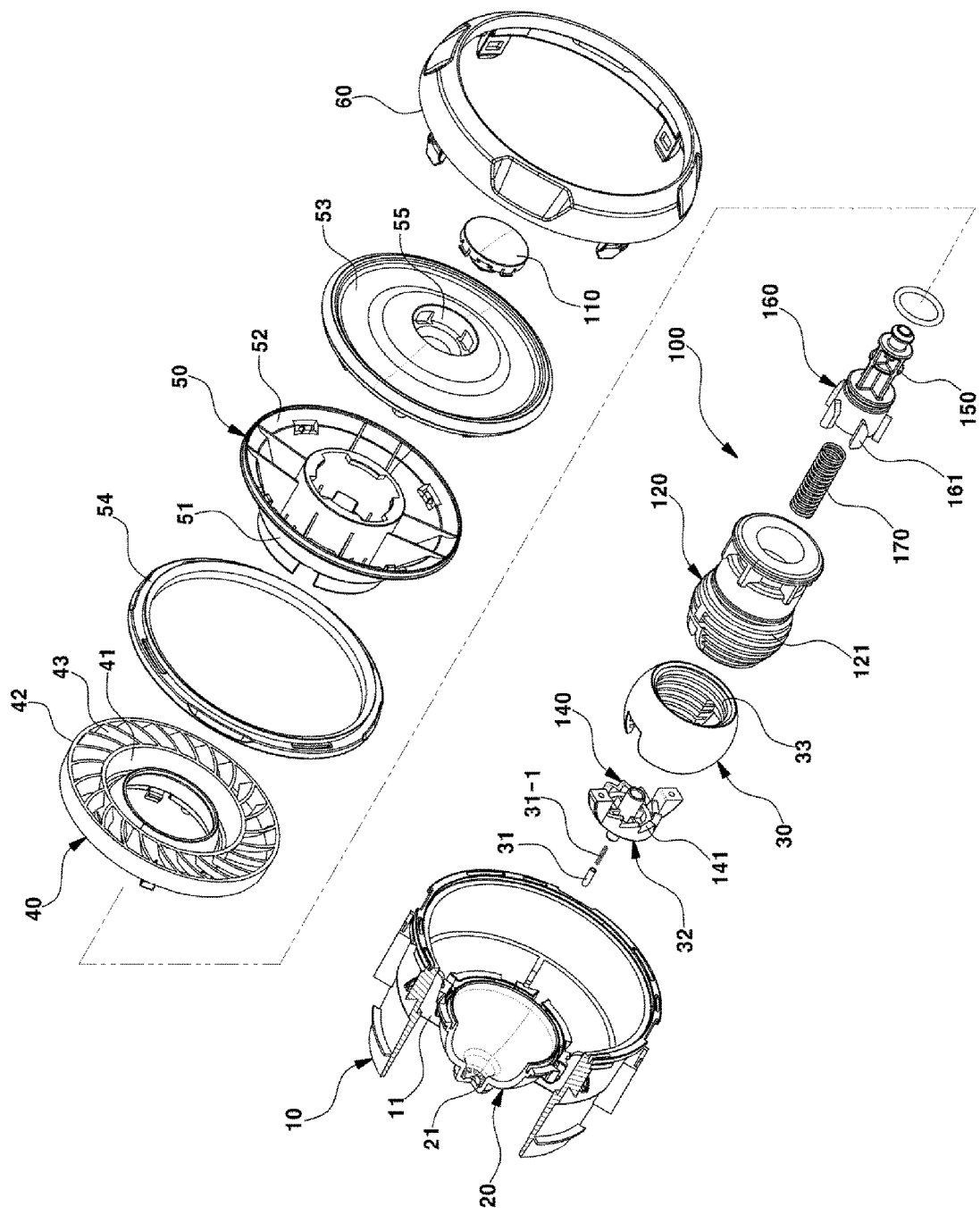
FIG. 1 is an exploded parts view of an air vent apparatus for a vehicle according to the present disclosure.
Figure 2:
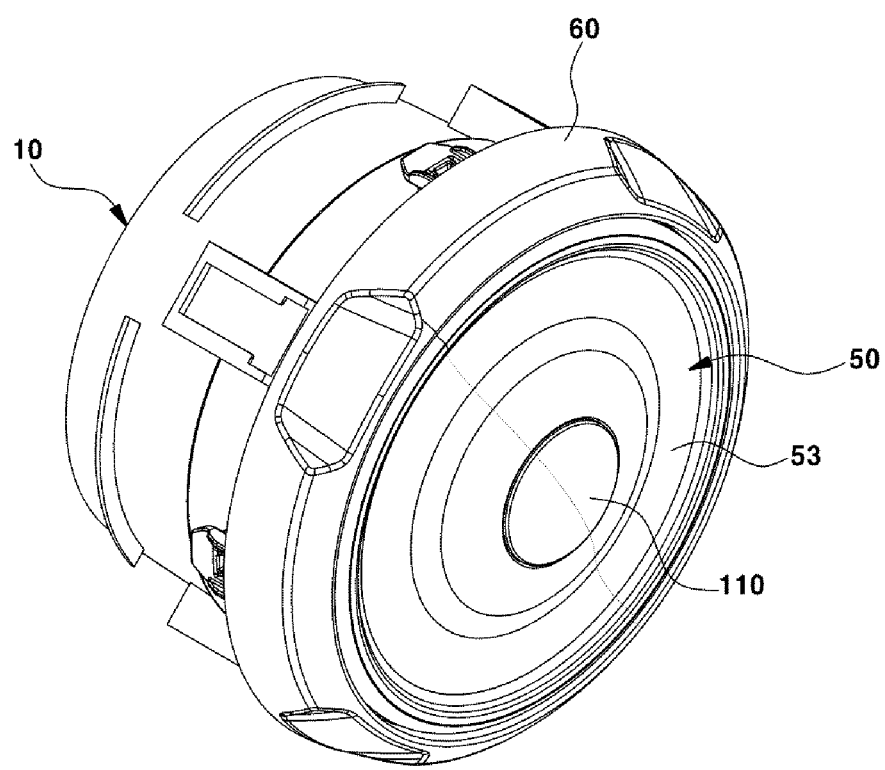
FIGS. 2 and 3 are assembly perspective diagrams illustrating the air vent apparatus for the vehicle according to the present disclosure.
Figure 3:
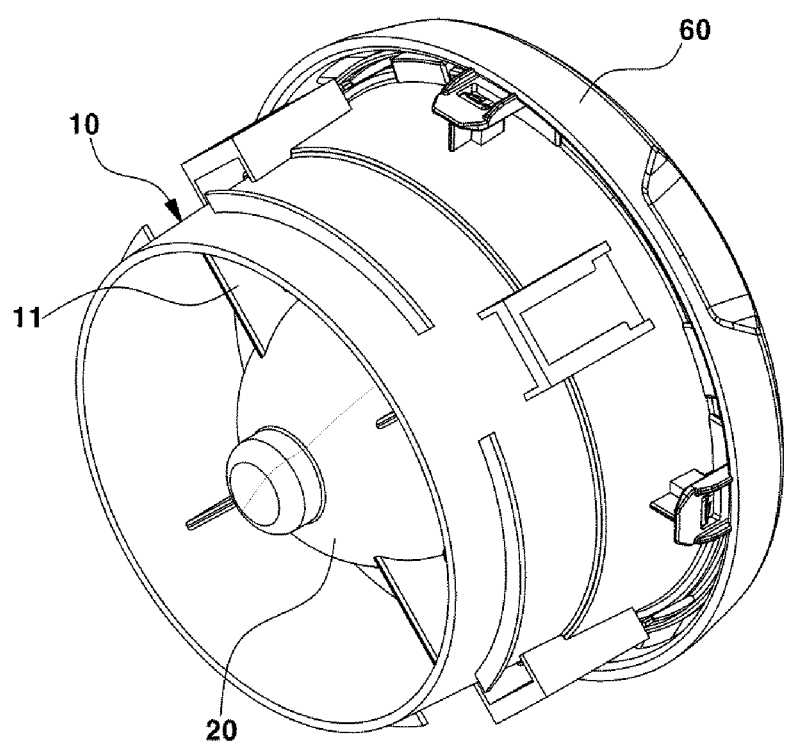

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings.

FIGS. 1 to 4 are diagrams illustrating an air vent apparatus for a vehicle according to the present disclosure, and in each drawing, reference numeral 10 denotes an air duct.

The air duct 10 is an air flow tube for allowing air (e.g., cooled or heated air) from an air conditioner (not illustrated) to flow into an interior of the vehicle, and connected with an air discharge side of the air conditioner.

A hemispherical ball joint housing 20 opened toward the vehicle interior is mounted inside the air duct 10.

Preferably, a plurality of connecting plates 11 are integrally connected between an outer diameter of the ball joint housing 20 and an inner wall of the air duct 10 so that the ball joint housing 20 is disposed at an inner central portion of the air duct 10.

A spherical ball housing 30 having a hole penetrated in a front-rear direction is inserted into and fastened to the ball joint housing 20.

A plurality of rotational angle limiting grooves 21 are formed at a rear portion of the ball joint housing 20, a separate ball cap 32 is disposed at a rear portion of the ball housing 30, and an angle limiting pin 31 selectively inserted into the plurality of rotational angle limiting grooves 21 is formed to be protruded at a rear surface of the ball cap 32.

Therefore, the angle limiting pin 31 is inserted into and mounted at the rear surface of the ball cap 32 together with a supporting spring 31-1 so that the angle limiting pin 31 is selectively inserted into the plurality of rotational angle limiting grooves 21 by an elastic restoring force of the supporting spring 31-1.

Figure 8A:
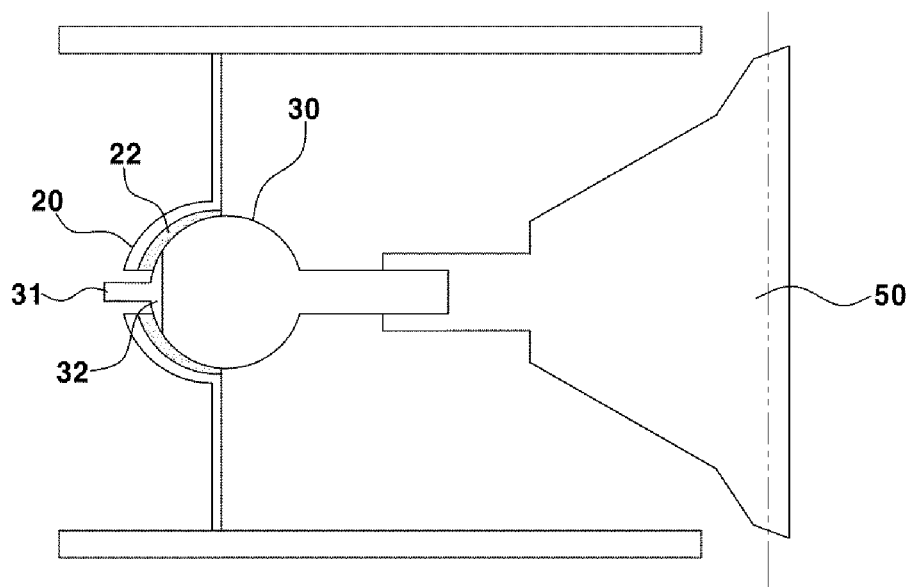
FIGS. 8A and 8B are cross-sectional diagrams illustrating an embodiment of a ball joint structure of the wing cover of the air vent apparatus for the vehicle according to the present disclosure.
Figure 8B:
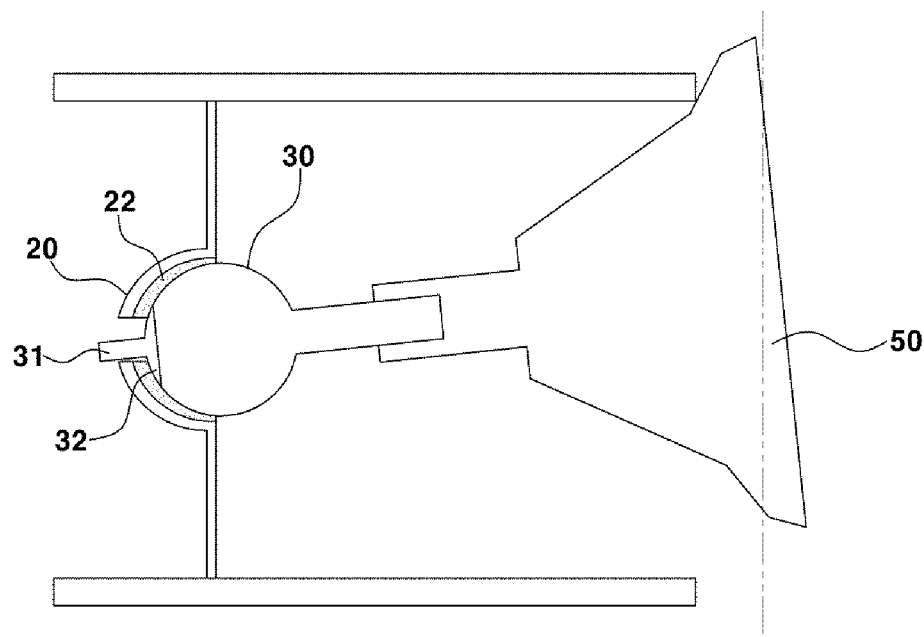

Preferably, as illustrated in FIGS. 8A and 8B, a resistance providing rubber 22 that is in close contact with the rear surface of the ball cap 32 in order to provide the resistance upon rotation of the ball housing 30 can be attached to an inner surface of the ball joint housing 20.

Therefore, as described later, when a wing cover 50 is angularly adjusted in a desired direction, the ball housing 30 connected with the wing cover 50 through a pop-up driving device 100, etc. rotates at the same angle, and the maximum rotational angle of the wing cover 50 is limited until the angle limiting pin 31 of the ball cap 32 mounted in the ball housing 30 is selectively inserted into the rotational angle limiting groove 21 of the ball joint housing 20.

A frictional resistance force is provided from the resistance providing rubber 22 contacting the rear surface of the ball cap 32 upon rotation of the ball housing 30 so that the ball housing 30 and the wing cover 50 can be stopped at a desired rotational angle.

In addition, as described later, a cam cap 140, in which a plurality of rotational guide saw teeth 141 are formed at regular intervals along a circumferential direction thereof as a configuration of the pop-up driving device, is formed at a front surface portion of the ball cap 32 mounted at the rear portion of the ball housing 30.

Meanwhile, an air guide 40 for straightly guiding the air flowing from the air conditioner toward the interior is mounted between the outer diameter portion of the ball joint housing 20 and an inner diameter portion (i.e., inner wall) of the air duct 10.

In particular, the air guide 40 is composed of an inside ring 41 that is in close contact with the outer diameter portion of the ball joint housing 20, an outside ring 42 that is in close contact with the inner diameter portion of the air duct 10, and a plurality of streamlined vanes 43 connected between the inside ring 41 and the outside ring 42, and each streamlined vane 43 forms the air flowing from the air conditioner toward the interior in the form of a whirlwind (vortex) to straightly guide it toward the interior.

Particularly, the wing cover 50 connected with the ball housing 30 through the pop-up driving device 100 is disposed at an outlet side of the air duct 10.

The wing cover 50 is composed of a wing body 52 having an air guide surface 51 having a diameter that is gradually narrowed toward the inside (the opposite side of the vehicle interior direction) of the air duct 10, and an operating plate 53 fastened to the front surface portion of the wing body 52 and exposed to the vehicle interior direction.

The wing cover 50 can be manufactured as a part in which the wing body 52 and the operating plate 53 are integrally molded.

Preferably, considering that the wing cover 50 serves as a damper door for blocking the flow of air discharged to the interior of the vehicle when being disposed at a position of closing the outlet of the air duct 10, a sealing rubber 54 for blocking air leakage upon closing the wing cover 50 is attached to a portion that contacts the outlet of the air duct 10 at the rear surface portion of the wing body 52.

The wing cover 50 can be angularly adjusted while rotating around the ball housing 30, and performs a pop-up operation that is protruded and moved forwards by the pop-up driving device 100.

The pop-up driving device 100 is connected between the ball housing 30 and the wing cover 50 to provide a pop-up driving force for protruding and moving the wing cover 50 in a forward direction.

Meanwhile, a bezel 60, which performs a kind of decorative function when viewed from the interior, is mounted at the front surface portion of the air duct 10 and disposed at the front edge position of the wing cover 50.

Herein, the pop-up driving device according to an embodiment of the present disclosure will be described as follows.

Figure 5A:
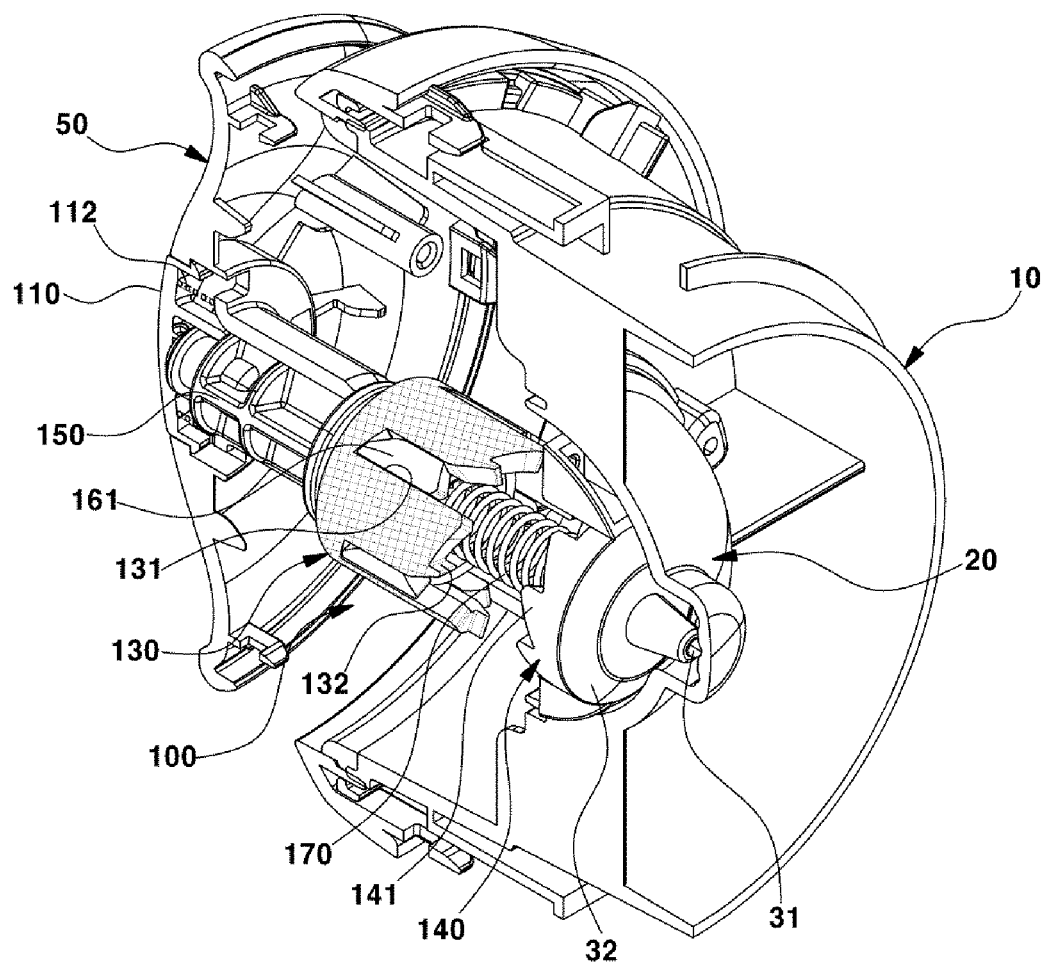
FIGS. 5A to 5C are enlarged cross-sectional diagrams illustrating major parts of an embodiment of a pop-up driving device of a wing cover of the air vent apparatus for the vehicle according to the present disclosure.
Figure 5B:
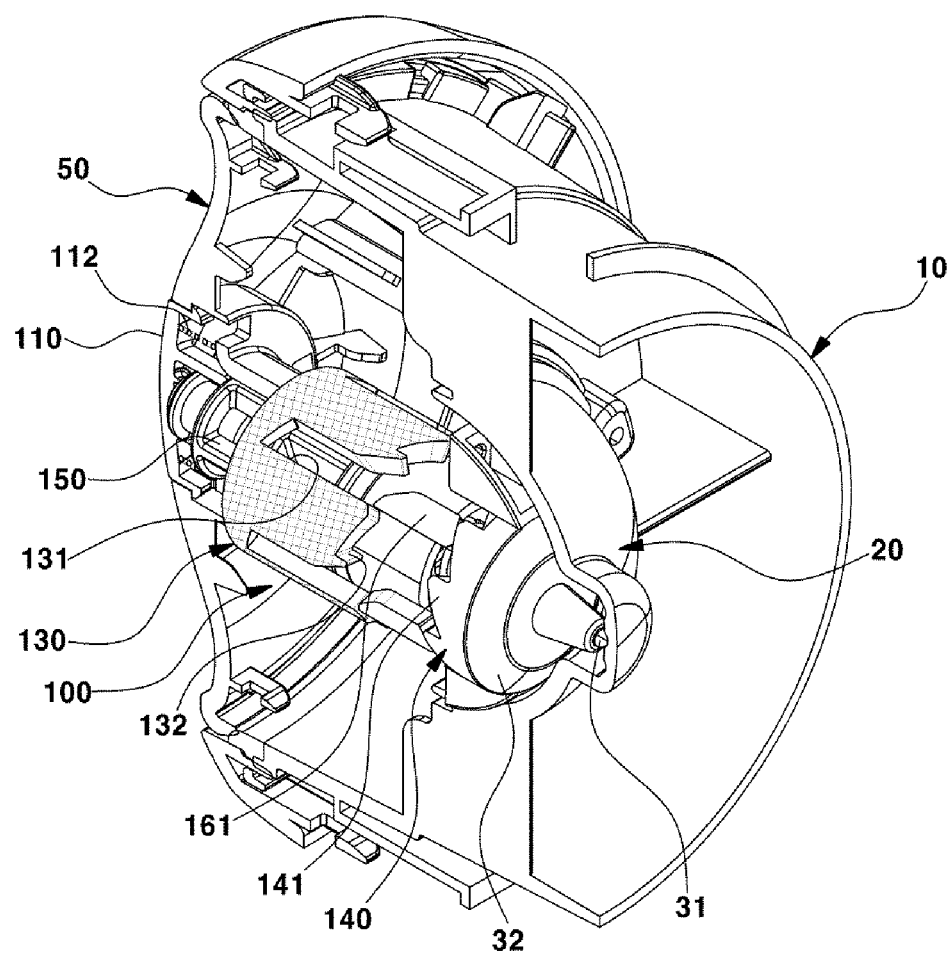
Figure 5C:
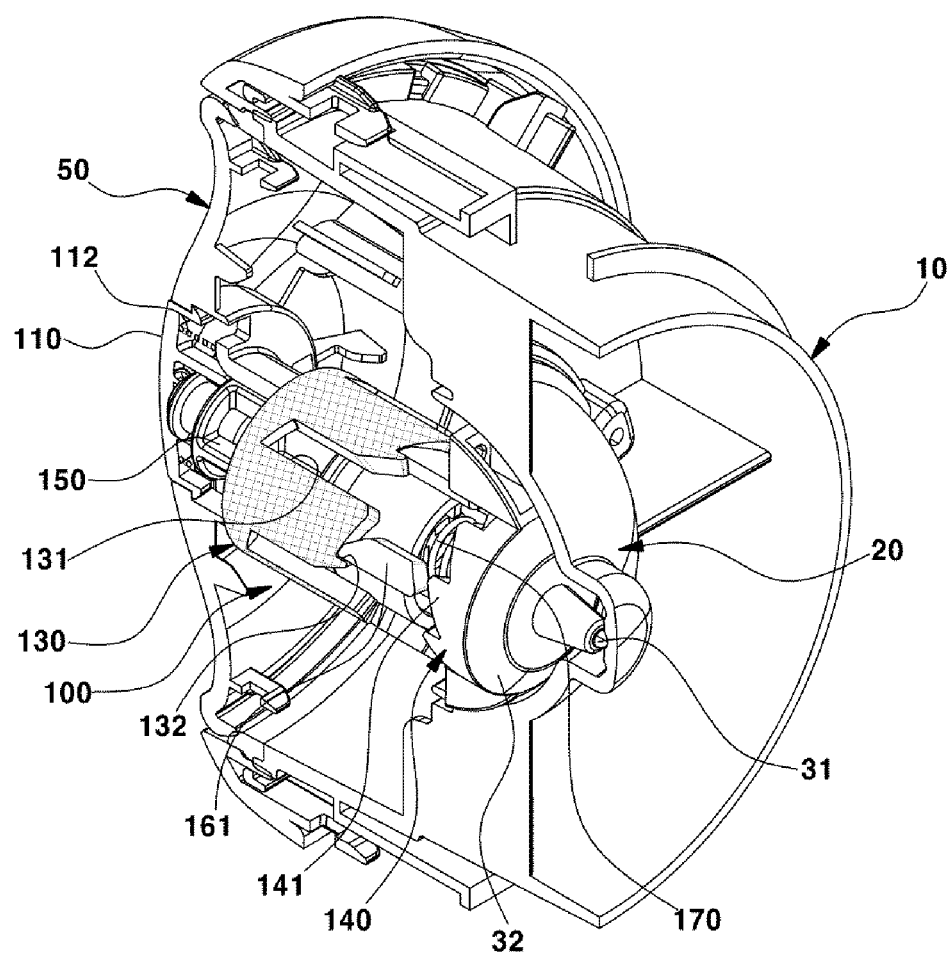
Figure 13A:
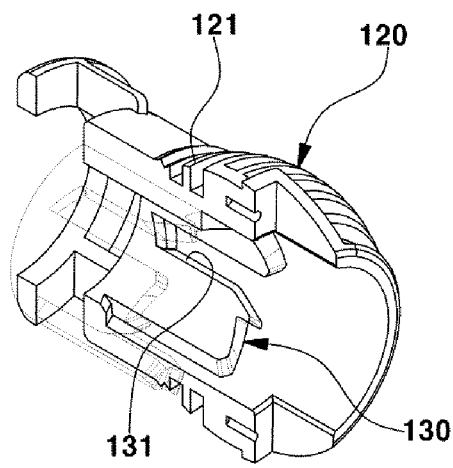
FIGS. 13A and 13B are diagrams illustrating that a cam housing and a fixed cam therein in a configuration of the pop-up driving device of the wing cover according to an embodiment of the present disclosure are integrally formed.
Figure 13B:
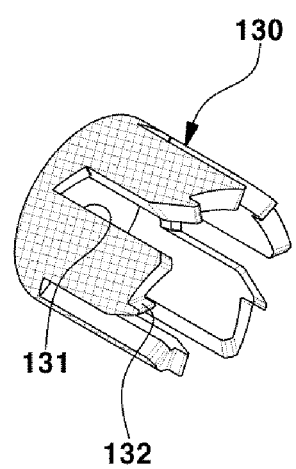

FIGS. 5A to 5C are enlarged diagrams illustrating major parts of an embodiment of the pop-up driving device of the wing cover of the air vent apparatus for the vehicle according to the present disclosure, and FIGS. 13A and 13B are diagrams illustrating that a cam housing and a fixed cam therein are integrally formed in a configuration of the pop-up driving device of the wing cover according to an embodiment of the present disclosure.

The pop-up driving device 100 according to an embodiment of the present disclosure is configured to include a push-lock mechanism applied to a ball pen, etc.

For this purpose, a knob 110 is mounted (e.g., in a pressing manner) at the front surface of the wing cover 50.

Figure 4:
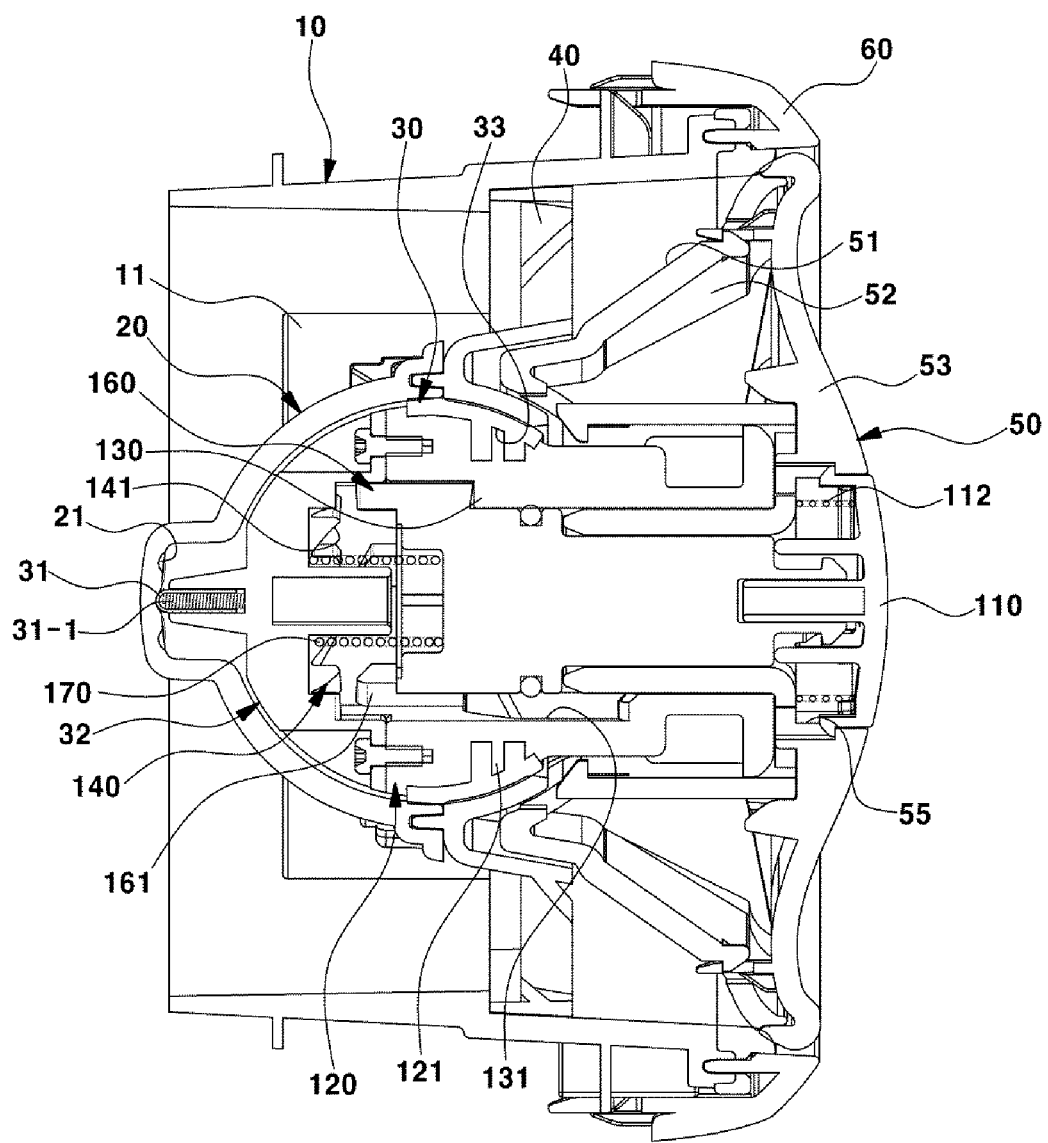
FIG. 4 is across-sectional diagram illustrating the air vent apparatus for the vehicle according to the present disclosure.

A knob seating groove 55 in which the knob 110 is inserted is formed in the front surface of the wing cover 50, and as illustrated in FIG. 4, an auxiliary spring 112 for providing an elastic restoring force after the knob 110 is pressed is connected between the back surface of the knob 110 and the bottom surface of the knob seating groove 55.

In addition, a cam housing 120 is fastened to the inside of the ball housing 30.

In particular, a concave portion 33 is formed at the inner diameter portion of the ball housing 30, and a convex portion 121 press-fitted into and fastened to the concave portion 33 is formed at the outer diameter portion of the cam housing 120.

Therefore, the convex portion 121 of the cam housing 120 is press-fitted into and fastened to the concave portion 33 of the ball joint housing 20 so that the cam housing 120 is fixed in the ball housing 30.

In addition, as illustrated in FIGS. 13A and 13B, a fixed cam 130 is formed inside the cam housing 120, and the fixed cam 130 is formed with a plurality of cam slide grooves 131 arranged at regular intervals along a circumferential direction thereof, and is provided as a hollow structure in which a latching projection 132 is formed at the rear surface portion thereof.

As described above, the ball cap 32 is disposed at the rear portion of the ball housing 30, and the ball cap 32 is fastened to the rear surface of the cam housing 120 fastened to the inside of the ball housing 30, and particularly, the cam cap 140 of a plate structure in which the plurality of rotational guide saw teeth 141 are formed at regular intervals along a circumferential direction thereof is formed at the front surface portion of the ball cap 32.

In addition, the front end portion of a pop-up rod 150 is connected to the rear surface of the knob 110, and the rear end portion of the pop-up rod 150 is extended to the inside of the fixed cam 130 through the central portion of the wing cover 50.

In addition, a rotary cam 160 is rotatably connected to the end of the rear end of the pop-up rod 150, and the rotary cam 160 is provided as a structure in which a plurality of slide cams 161 moving along the plurality of cam slide grooves 131 of the fixed cam 130 are formed at regular intervals along the circumferential direction thereof.

In addition, a main spring 170 for providing an elastic restoring force upon pop-up of the wing cover 50 is compressibly connected between the rotary cam 160 and the cam cap 140.

Herein, an operating flow of the air vent apparatus of the present disclosure having the above configuration will be described as follows.

Closed Mode

Figure 10A:
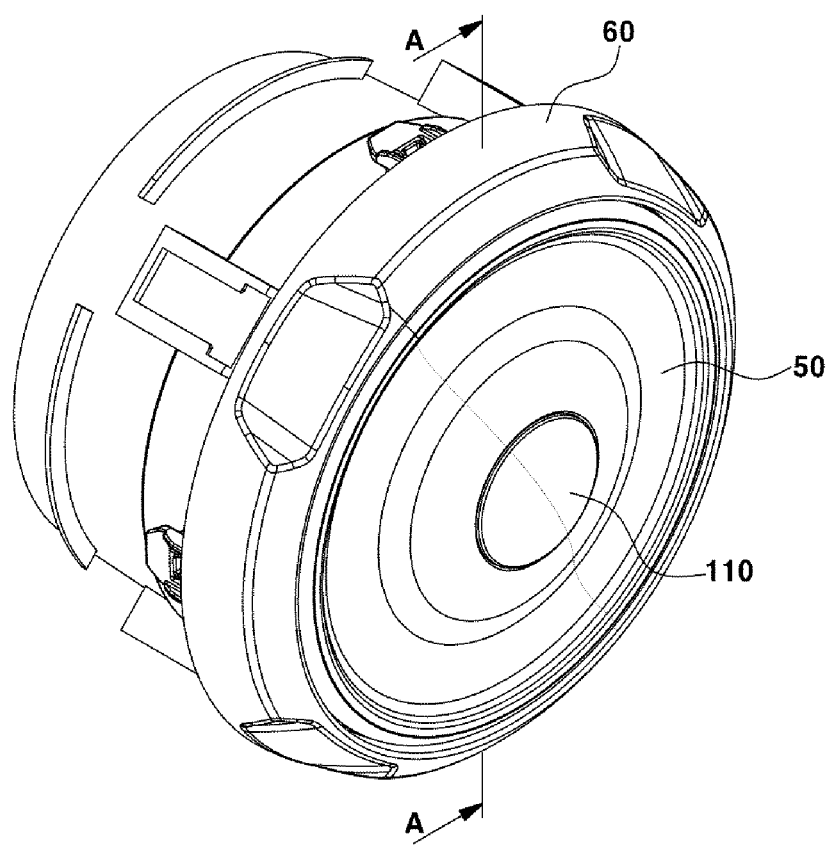
FIGS. 10A and 10B are a perspective diagram and a cross-sectional diagram illustrating a closed mode of the air vent apparatus for the vehicle according to the present disclosure.
Figure 10B:
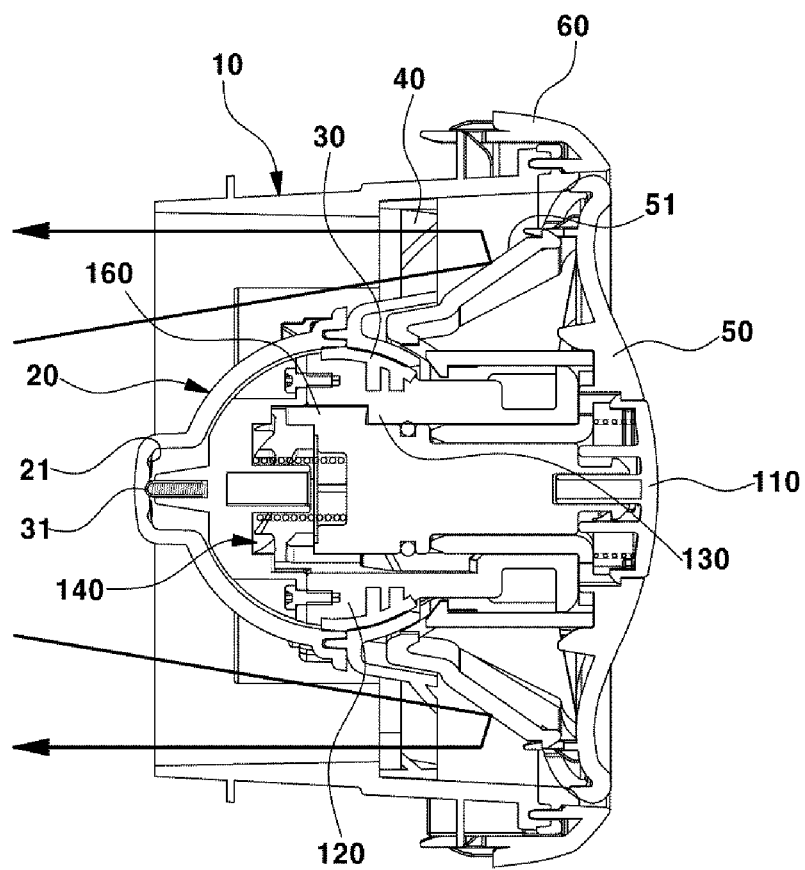

FIGS. 10A and 10B are diagrams illustrating a closed mode of the air vent apparatus for the vehicle according to the present disclosure.

The closed mode refers to a mode in which the wing cover 50 closes the air duct 10 and functions as a conventional damper door.

Firstly, the pop-up rod 150 of the pop-up driving device 100 is advanced in the vehicle interior direction, as illustrated in FIG. 5A, in a state where the wing cover 50 has been opened, that is, popped-up, and the rotary cam 160 connected to the end of the rear end of the pop-up rod 150 is disposed inside the fixed cam 130.

In addition, the slide cam 161 of the rotary cam 160 is inserted into the cam slide groove 131 of the fixed cam 130.

When the user presses the knob 110 mounted at the front surface of the wing cover 50 in the opened state of the wing cover 50, as illustrated in FIG. 5B, the pop-up rod 150 is moved rearwards, and simultaneously the rotary cam 160 connected to the end of the rear end of the pop-up rod 150 is moved rearwards to the outside the fixed cam 130.

In addition, the slide cam 161 of the rotary cam 160 is also moved rearwards to be detached from the cam slide groove 131 of the fixed cam 130, and the rear surface of the slide cam 161 is in close contact with the rotational guide saw teeth 141 of the cam cap 140.

Then, when the user releases the knob 110 mounted at the front surface of the wing cover 50, the rotary cam 160 is rotated by an operation in which the rear surface of the slide cam 161 moves along the inclined surface of the rotational guide saw teeth 141, and as illustrated in FIG. 5C, the front end portion of the slide cam 161 is latched by the latching projection 132 of the fixed cam 130 so that the rotary cam 160 is locked and fixed.

As described above, as the rotary cam 160 is locked and fixed, the pop-up rod 150 is also fixed without the movement after being moved rearwards, and as illustrated in FIGS. 10A and 10B, the wing cover 50 is disposed at the closed position while closing the outlet of the air duct 10.

As illustrated in FIGS. 10A and 10B, when the wing cover 50 is disposed at the closed position while closing the outlet of the air duct 10, the air flowing from the air conditioner toward the vehicle interior along the inside of the air duct 10 is blocked by the wing cover 50.

As described above, since the wing cover 50 serves as the conventional damper door for blocking the air discharge, a part such as the conventional damper door can be unnecessary, thereby reducing the number of parts and reducing the number of assembling steps.

Straight Wind Mode

Figure 11A:
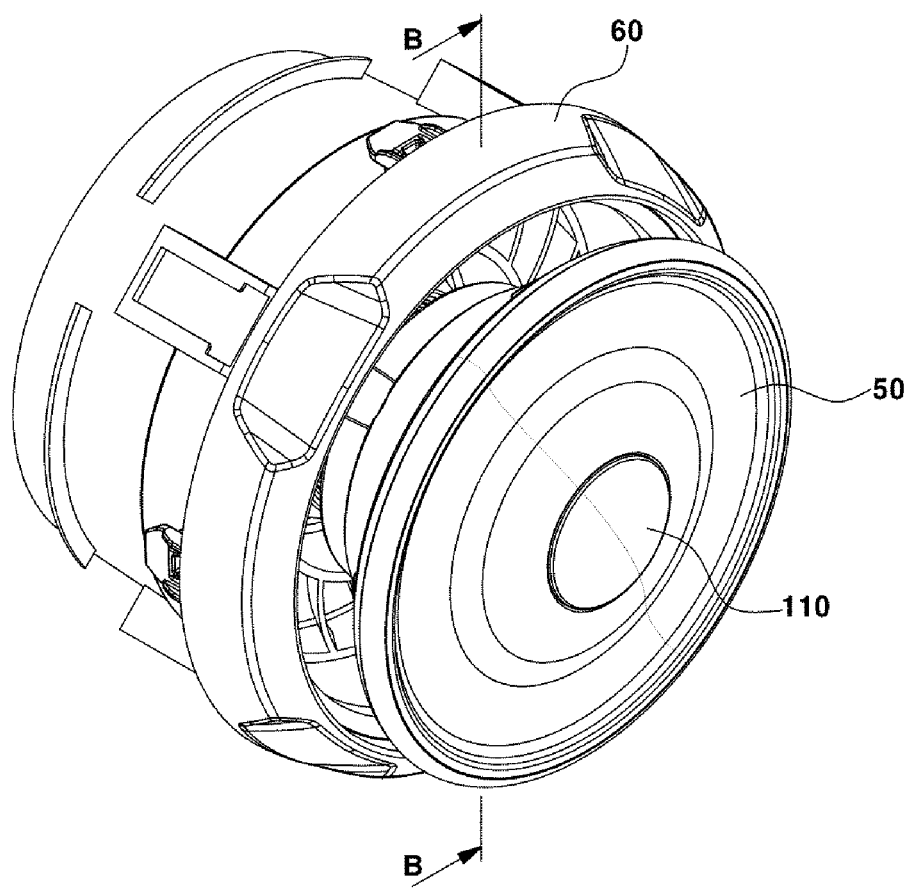
FIGS. 11A and 11B are a perspective diagram and a cross-sectional diagram illustrating a state in which the wind direction of the air has been adjusted in a straight direction by the pop-up of the wing cover of the air vent apparatus for the vehicle according to the present disclosure.
Figure 11B:
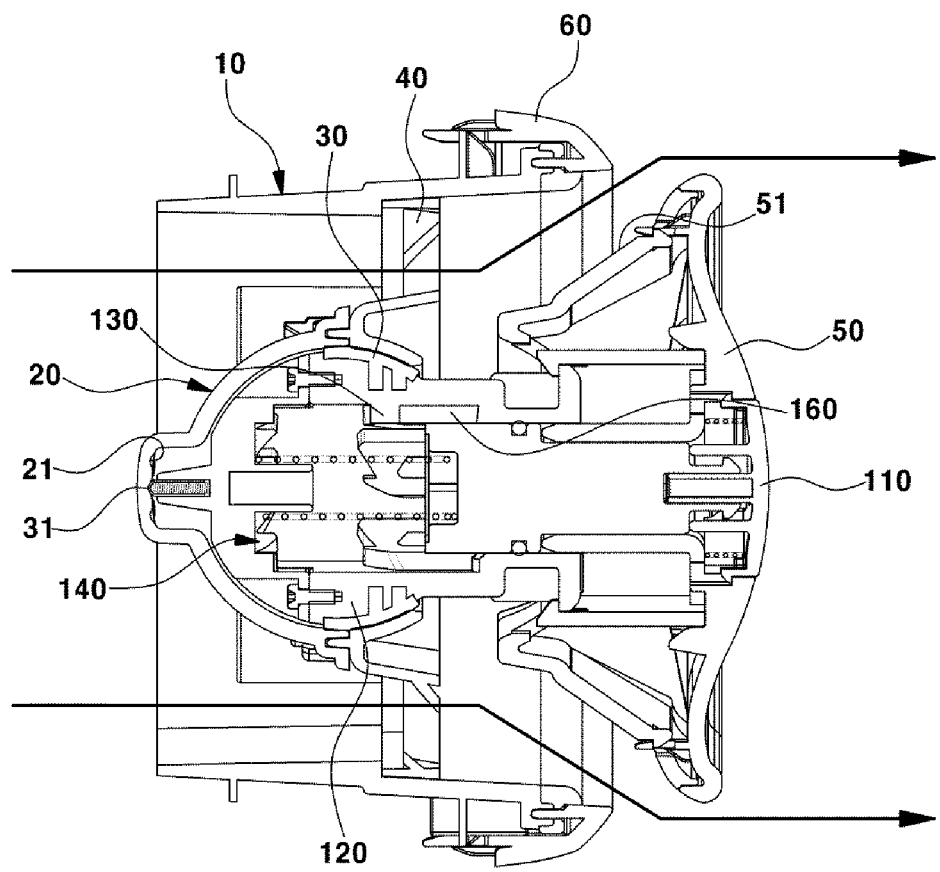

FIGS. 11A and 11B are diagrams illustrating a state where the wind direction of the air has been adjusted in a straight direction by the pop-up of the wing cover of the air vent apparatus for the vehicle according to the present disclosure.

The straight wind mode is a mode for guiding the air discharged from the air duct 10 to the interior in a straight direction.

Firstly, when the knob 110 is pressed in a state where the wing cover 50 has been closed, a pressing force is transferred to the pop-up rod 150 and the rotary cam 160.

Then, the slide cam 161 of the rotary cam 160 is slightly moved rearwards and the front end portion of the slide cam 161 is detached from the latching projection 132, and simultaneously the rotary cam 160 is rotated by an operation in which the rear surface of the slide cam 161 moves along the inclined surface of the rotational guide saw teeth 141.

Then, when the user releases the knob 110 mounted at the front surface of the wing cover 50, as illustrated in FIG. 5A, the slide cam 161 is advanced into and again inserted into the cam slide groove 131 of the fixed cam 130 so that the rotary cam 160 and the pop-up rod 150 are advanced.

Therefore, as the pop-up rod 150 is advanced, the wing cover 50 also performs a pop-up operation that is protruded forwards and opened, such that as illustrated in FIG. 11B, the wing cover 50 is opened so that an air discharge passage is formed between the wing cover 50 and the air duct 10.

Therefore, the air from the air conditioner is formed in the form of a whirlwind (vortex) by the streamlined vane 43 of the air guide 40 to be straightly guided toward the interior, then diffused along the air guide surface 51 of the wing cover 50, and then goes straight and discharged to the vehicle interior through the air discharge passage formed between the wing cover 50 and the air duct 10.

Wind Direction Adjustment Mode

Figure 12A:
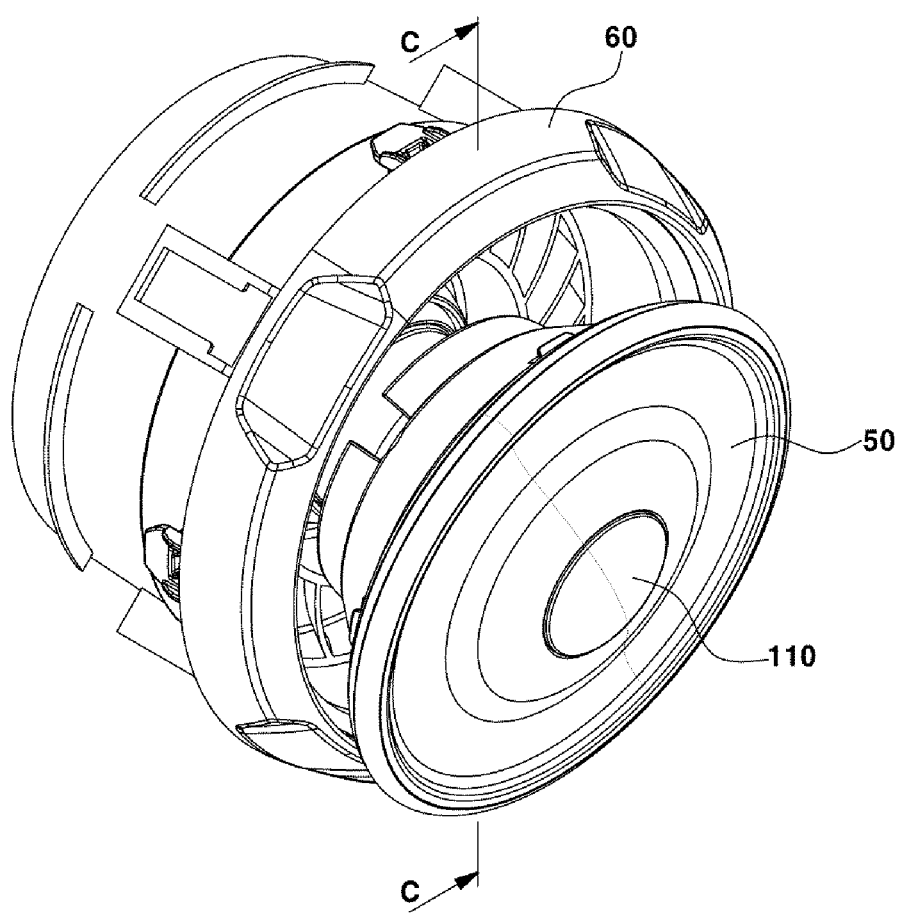
FIGS. 12A and 12B are a perspective diagram and a cross-sectional diagram illustrating a state of adjusting the wind direction of the air of the air vent apparatus for the vehicle according to the present disclosure in a desired direction.
Figure 12B:
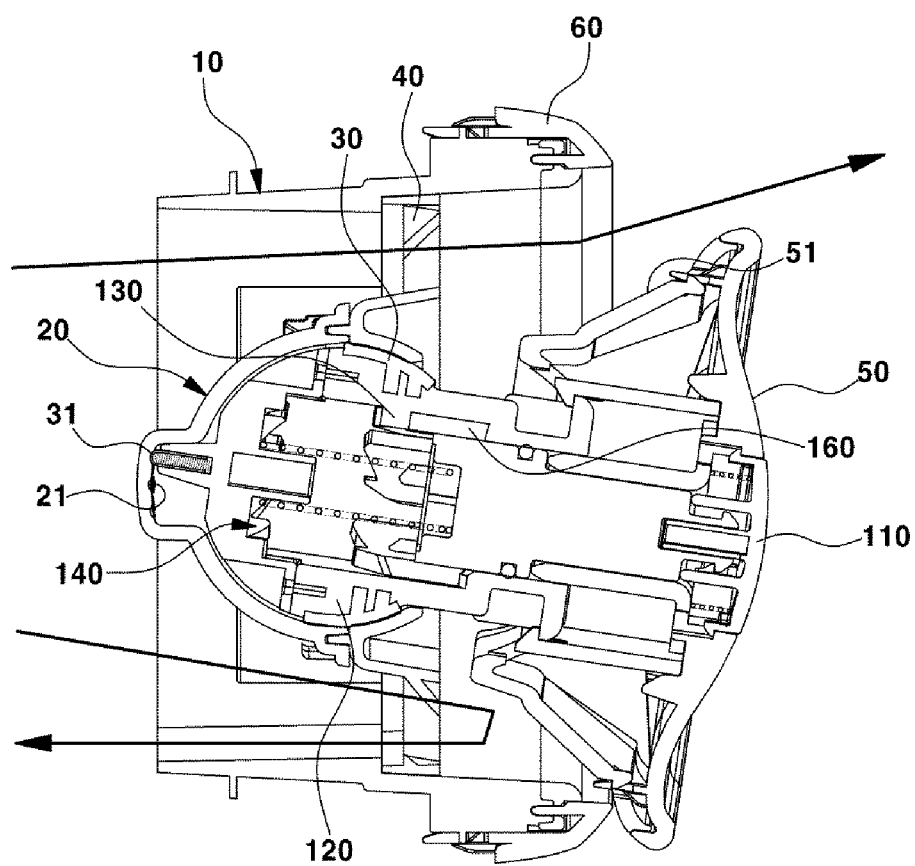

FIGS. 12A and 12B are diagrams illustrating a state of adjusting the wind direction of the air of the air vent apparatus for the vehicle according to the present disclosure in a desired direction.

As described above, the wind direction adjustment mode refers to a mode that can rotate the angle of the wing cover 50 in a desired direction in a state where the wing cover 50 has been popped-up to adjust the wind direction of the air discharged from the air duct 10 to the vehicle interior in a desired direction.

Therefore, when the user holds and angularly adjusts the wing cover 50 in a desired direction, the ball housing 30 connected with the wing cover 50 through the pop-up driving device 100, etc. rotates at the same angle so that the air discharge passage of the opposite side of the direction that has angularly adjusted the wing cover 50 can be increased to determine the wind direction of the air.

At this time, the maximum rotational angle of the wing cover 50 is limited until the angle limiting pin 31 of the ball cap 32 mounted in the ball housing 30 is selectively inserted into the rotational angle limiting groove 21 of the ball joint housing 20.

For example, as illustrated in FIGS. 12A and 12B, when the wing cover 50 is angularly rotated downwards, the lower end portion of the wing cover 50 contacts the outlet of the air duct 10, thereby blocking the air discharge downwards and simultaneously increasing the air discharge passage formed between the upper end portion of the wing cover 50 and the outlet of the air duct 10.

Therefore, the air from the air conditioner is formed in the form of a whirlwind (vortex) by the streamlined vane 43 of the air guide 40 to be straightly guided toward the interior, then guided upwards along the air guide surface 51 of the wing cover 50, and then discharged upwards from the vehicle interior through the increased air discharge passage between the upper end portion of the wing cover 50 and the outlet of the air duct 10.

When the wing cover 50 is angularly adjusted in a desired direction, the discharge direction of the air can be freely adjusted not only upwards but also downwards, and leftwards and rightwards, etc.

For example, when the wing cover 50 is angularly rotated upwards, the upper end portion of the wing cover 50 contacts the outlet of the air duct 10, thereby blocking the air discharge upwards, and simultaneously performing the air discharge downwards through the air discharge passage formed between the lower end portion of the wing cover 50 and the outlet of the air duct 10.

Alternatively, when the wing cover 50 is angularly rotated leftwards, the left end portion of the wing cover 50 contacts the outlet of the air duct 10, thereby blocking the air discharge leftwards, and simultaneously performing the air discharge rightwards through the air discharge passage formed between the right end portion of the wing cover 50 and the outlet of the air duct 10.

Alternatively, when the wing cover 50 is angularly rotated rightwards, the right end portion of the wing cover 50 contacts the outlet of the air duct 10, thereby blocking the air discharge rightwards, and simultaneously performing the air discharge leftwards through the air discharge passage formed between the left end portion of the wing cover 50 and the outlet of the air duct 10.

As described above, it is possible to pop-up and then angularly rotate the wing cover 50 around the ball joint between the ball joint housing 20 and the ball housing 30 in a desired direction, thereby freely adjusting the wind direction of the air discharged to the interior in a desired direction.

Herein, another embodiment of the pop-up driving device for popping up the wing cover in a configuration of the air vent apparatus according to the present disclosure will be described as follows.

Figure 6A:
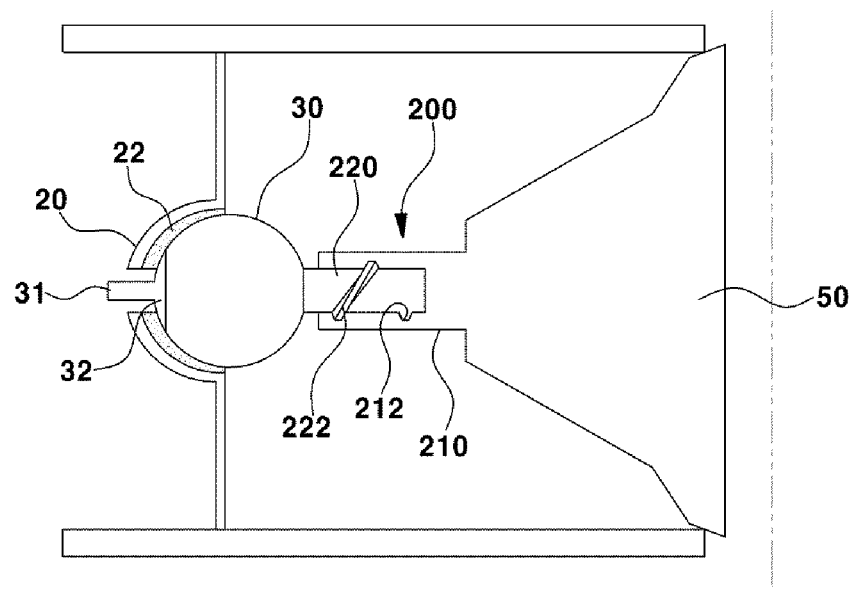
FIGS. 6A and 6B are cross-sectional diagrams illustrating major parts of another embodiment of the pop-up driving device of the wing cover of the air vent apparatus for the vehicle according to the present disclosure.
Figure 6B:
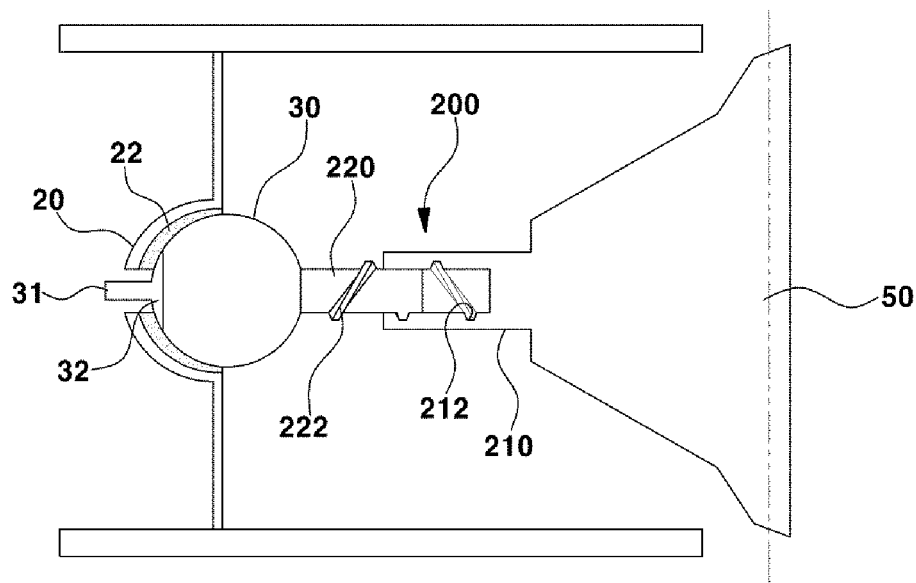

FIGS. 6A and 6B are cross-sectional diagrams illustrating another embodiment of the pop-up driving device of the wing cover of the air vent apparatus for the vehicle according to the present disclosure.

A pop-up driving device 200 according to another embodiment of the present disclosure is composed of a movable cylinder 210 provided as a structure in which a female screw 212 is formed therein to be integrally formed at the rear end portion of the wing cover 50, and a fixed cylinder 220 integrally formed at the front end portion of the ball housing 30 as a structure in which a male screw 222 is screw-fastened to the female screw 212.

Therefore, when the user holds and rotates the wing cover 50 in one direction, as illustrated in FIG. 6B, a pop-up operation, in which the movable cylinder 210 and the wing cover 50 are advanced by a screw rotation from which the male screw 222 is released from the female screw 212, can be performed.

Preferably, the engagement section between the female screw 212 and the male screw 222 can be set to the section in which the wing cover 50 can be rotated in the range of 900 to 180°.

Herein, still another embodiment of the pop-up driving device for popping up the wing cover in a configuration of the air vent apparatus according to the present disclosure will be described as follows.

Figure 7A:
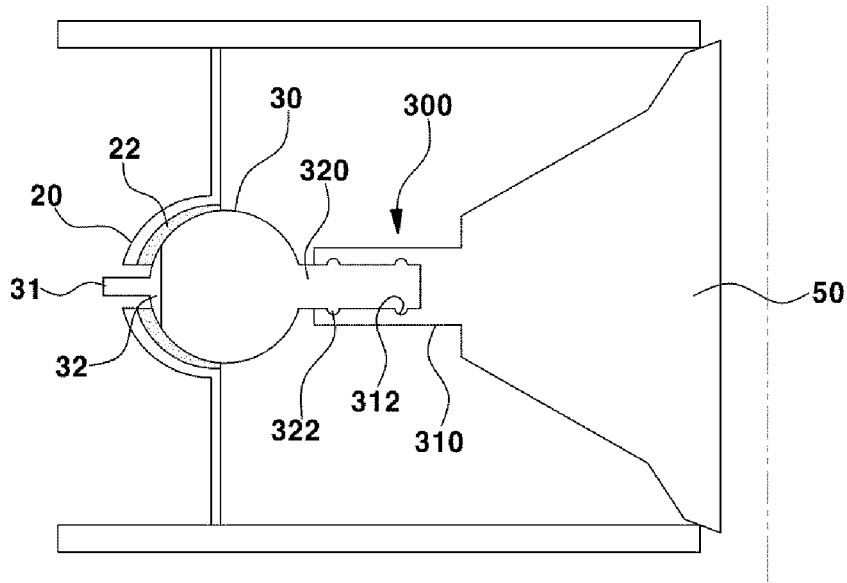
FIGS. 7A and 7B are cross-sectional diagrams illustrating major parts of still another embodiment of the pop-up driving device of the wing cover of the air vent apparatus for the vehicle according to the present disclosure.
Figure 7B:
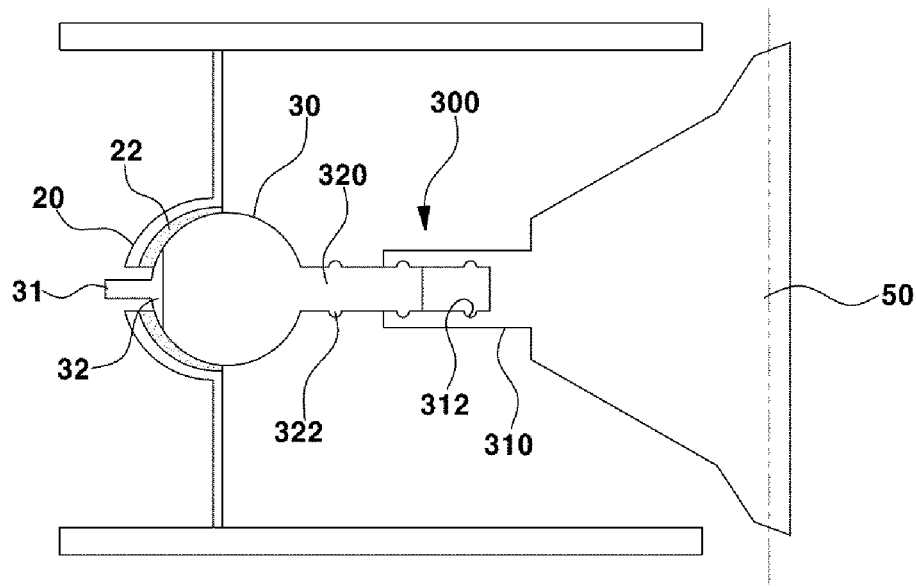

FIGS. 7A and 7B are cross-sectional diagrams illustrating still another embodiment of the pop-up driving device of the wing cover of the air vent apparatus for the vehicle according to the present disclosure.

A pop-up driving device 300 according to still another embodiment of the present disclosure is composed of a movable cylinder 310 provided as a structure in which a multi-stage locking groove 312 is formed therein to be integrally formed at the rear end portion of the wing cover 50, and a fixed cylinder 320 provided as a structure in which a locking protrusion 322 fastened to the multi-stage locking groove 312 is formed at the outer diameter portion thereof to be integrally formed at the front end portion of the ball housing 30.

Therefore, when the user holds and pulls the wing cover 50 in the vehicle interior direction, the locking protrusion 322 is detached from the multi-stage locking groove 312, such that as illustrated in FIG. 7B, a pop-up operation, in which the movable cylinder 310 and the wing cover 50 are advanced, can be performed.

Meanwhile, as illustrated in FIGS. 8A and 8B, when the wing cover 50 is popped up and then angularly rotated around the ball joint between the ball joint housing 20 and the ball housing 30 in a desired direction, the wing cover 50 is viewed as a figure tilted to one side when viewed from the vehicle interior as illustrated in FIG. 8B, thereby reducing appearance.

Therefore, a ball joint portion can be further formed at the rear end portion of the wing cover 50 in addition to the ball joint between the ball joint housing 20 and the ball housing 30 so that the front surface portion of the wing cover 50 can be kept in an upright vertical plane even if the wing cover 50 is popped-up and then angularly rotated.

Figure 9A:
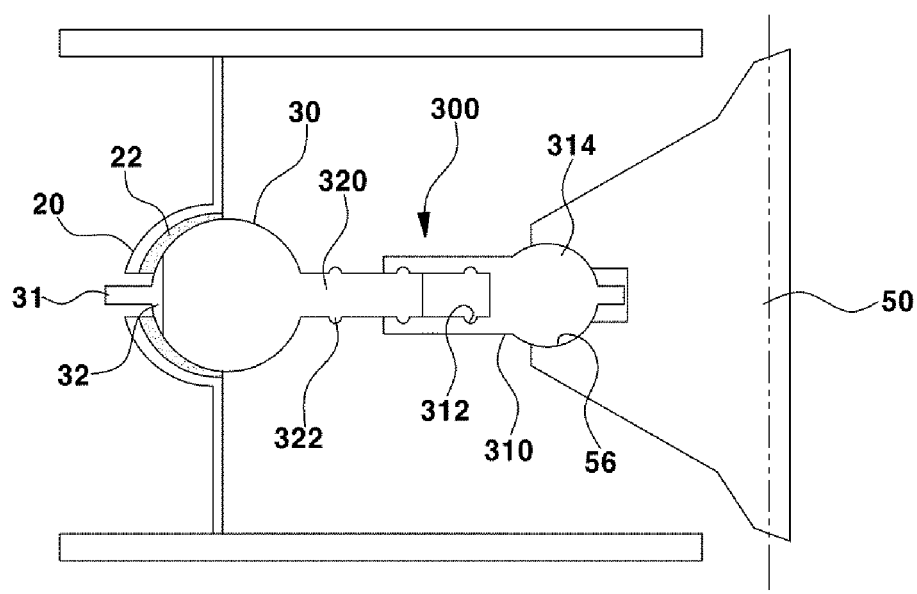
FIGS. 9A and 9B are cross-sectional diagrams illustrating another embodiment of the ball joint structure of the wing cover of the air vent apparatus for the vehicle according to the present disclosure.
Figure 9B:
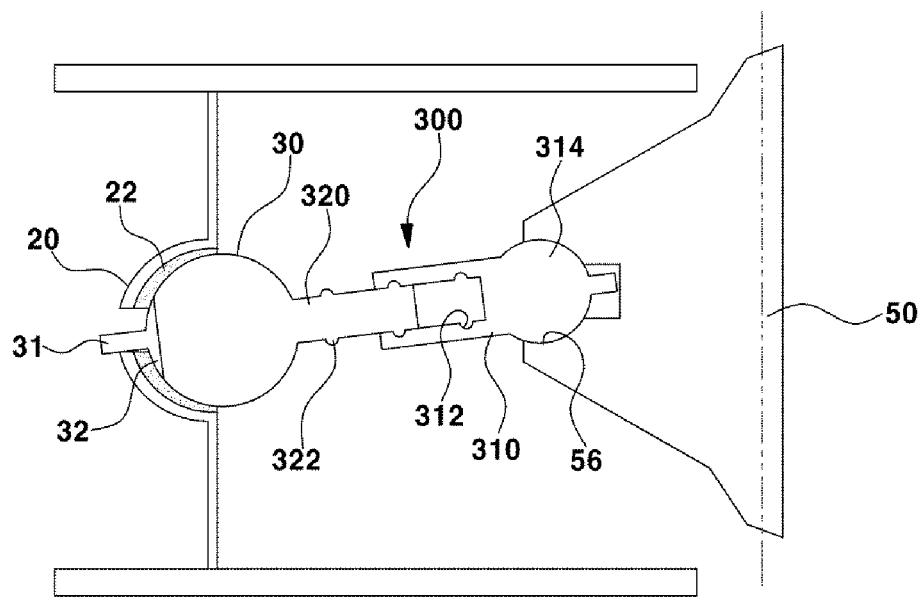

For this purpose, as illustrated in FIGS. 9A and 9B, a ball 314 is further formed at the front end portion of the movable cylinder 310, and a ball joint groove 56 having the ball 314 inserted therein is further formed at the rear surface portion of the wing cover 50.

Therefore, it is possible to adjust the wing cover 50 in the upright vertical plane around the ball joint portion between the ball 314 and the ball joint groove 56 in a state where the wing cover 50 has been popped-up and then angularly rotated, such that the wing cover 50 is not tilted to one side and stands upright when viewed from the vehicle interior, thereby improving appearance.

As described above, although the embodiments of the present disclosure have been described in detail, the claims of the present disclosure is not limited to the above-described embodiments, and various modifications and improvements by those skilled in the art using the basic concept of the present disclosure defined in the appended claims can also be included the claims of the present disclosure.

What is claimed is:

1. An air vent apparatus for a vehicle, comprising:
    an air duct having a ball joint housing formed therein;
    a ball housing rotatably fastened within the ball joint housing;
    an air guide mounted between an outer surface of the ball joint housing and an inner surface of the air duct to straightly guide the air discharged to an interior of the vehicle;
    a wing cover connected with the ball housing and disposed at an outlet of the air duct to be pop-up and angularly adjustable; and
    a pop-up driving device connected between the ball housing and the wing cover to pop-up and drive the wing cover.

2. The air vent apparatus for the vehicle of claim 1,
A wherein a connecting plate is integrally connected between the outer surface of the ball joint housing and an inner wall of the air duct so that the ball joint housing is disposed at an inner central portion of the air duct.

3. The air vent apparatus for the vehicle of claim 1,
wherein a plurality of rotational angle limiting grooves are formed in the ball joint housing, a ball cap is mounted at a rear portion of the ball housing, and an angle limiting pin selectively inserted into one of the plurality of rotational angle limiting grooves is formed to be protruded from a rear surface of the ball cap.

4. The air vent apparatus for the vehicle of claim 3,
wherein the angle limiting pin is inserted into and mounted at the rear surface of the ball cap together with a supporting spring so that the angle limiting pin is selectively inserted into one of the plurality of rotational angle limiting grooves by an elastic restoring force of the supporting spring.

5. The air vent apparatus for the vehicle of claim 3,
wherein a resistance providing rubber that is in close contact with the rear surface of the ball cap in order to provide resistance upon rotation of the ball housing is attached to an inner surface of the ball joint housing.

6. The air vent apparatus for the vehicle of claim 1,
wherein the air guide is provided as a structure in which a plurality of streamlined vanes forming a whirlwind for straight wind are connected between an inside ring and an outside ring.

7. The air vent apparatus for the vehicle of claim 1,
wherein the wing cover is composed of a wing body having an air guide surface that is gradually narrowed toward an opposite side of the direction of the interior of the vehicle, and an operating plate fastened to a front surface portion of the wing body and exposed toward the interior of the vehicle.

8. The air vent apparatus for the vehicle of claim 7,
wherein a sealing rubber is provided for blocking air leakage upon closing the wing cover.

9. The air vent apparatus for the vehicle of claim 1,
wherein the pop-up driving device comprises:
    a knob mounted at a front surface of the wing cover;
    a cam housing fastened to an inside of the ball housing;
    a fixed cam having a plurality of cam slide grooves formed along a circumferential direction thereof, and provided as a hollow structure in which a latching projection is formed at a rear surface portion thereof to be formed inside the cam housing;
    a cam cap formed at a front surface portion of the ball cap mounted at a rear portion of the ball housing, wherein the cam cap is a plate structure in which a plurality of rotational guide saw teeth are formed at regular intervals along a circumferential direction thereof;
    a pop-up rod having a front end portion connected to a rear surface of the knob, and having a rear end portion extended to an inside of the fixed cam through a central portion of the wing cover;
    a rotary cam provided as a structure in which a plurality of slide cams moving along the plurality of cam slide grooves are formed along a circumferential direction thereof to be rotatably connected to the rear end portion of the pop-up rod; and a main spring compressibly connected between the rotary cam and the cam cap.

10. The air vent apparatus for the vehicle of claim 9, wherein a concave portion is formed at an inner surface of the ball housing, and a convex portion press-fitted into and fastened to the concave portion is formed at an outer surface of the cam housing.

11. The air vent apparatus for the vehicle of claim 9, wherein a knob seating groove having the knob inserted therein is formed at a front surface of the wing cover.

12. The air vent apparatus for the vehicle of claim 11, wherein an auxiliary spring for providing an elastic restoring force after the knob is pressed is connected between a back surface of the knob and a bottom surface of the knob seating groove.

13. The air vent apparatus for the vehicle of claim 1, wherein the pop-up driving device comprises:

a movable cylinder provided as a structure in which a female screw is formed therein to be integrally formed at a rear end portion of the wing cover; and a fixed cylinder integrally formed at a front end portion of the ball housing as a structure in which a male screw screw-fastened to the female screw is formed.

14. The air vent apparatus for the vehicle of claim 1, wherein the pop-up driving device comprises:

a movable cylinder provided as a structure in which a multi-stage locking groove is formed therein to be integrally formed at a rear end portion of the wing cover; and a fixed cylinder integrally formed at a front end portion of the ball housing as a structure having a locking protrusion fastened to the multi-stage locking groove.

15. The air vent apparatus for the vehicle of claim 14, wherein a ball is formed at a front end portion of the movable cylinder, and a ball joint groove is formed at a rear surface portion of the wing cover.

* * * * *